United States Patent [19]

Verdoorn, Jr.

[11] Patent Number: 5,524,204
[45] Date of Patent: Jun. 4, 1996

[54] METHOD AND APPARATUS FOR DYNAMICALLY EXPANDING A REDUNDANT ARRAY OF DISK DRIVES

[75] Inventor: William G. Verdoorn, Jr., Rochester, Minn.

[73] Assignee: International Business Machines Corporation, Armonk, N.Y.

[21] Appl. No.: 334,169

[22] Filed: Nov. 3, 1994

[51] Int. Cl.$^6$ .......................... G01R 31/28; G06F 11/00
[52] U.S. Cl. .................................. 395/182.04; 395/441
[58] Field of Search .......................... 395/575, 182.04, 395/182.05, 441; 371/10.1, 10.2; 364/245.4

[56] References Cited

U.S. PATENT DOCUMENTS

| | | | |
|---|---|---|---|
| 4,473,878 | 9/1984 | Zolnowsky | 364/200 |
| 4,511,964 | 4/1985 | Georg | 364/200 |
| 4,989,206 | 1/1991 | Dunphy, Jr. et al. | 371/10.1 |
| 5,077,736 | 12/1991 | Dunphy | 371/10.1 |
| 5,088,081 | 2/1992 | Farr | 371/10.1 X |
| 5,208,813 | 5/1993 | Stallmo | 371/10.1 |
| 5,237,658 | 8/1993 | Walker et al. | 395/200 |
| 5,269,011 | 12/1993 | Yanai | 395/425 |
| 5,271,012 | 12/1993 | Blaum et al. | 371/10.1 |
| 5,278,838 | 1/1994 | Ng et al. | 371/10.1 |
| 5,301,297 | 4/1994 | Menon | 371/10.1 X |
| 5,303,244 | 4/1994 | Watson | 371/10.1 |
| 5,367,669 | 11/1994 | Holland | 371/10.1 X |
| 5,390,327 | 2/1995 | Lubbers | 395/575 |
| 5,392,244 | 2/1995 | Jacobson | 371/10.1 X |
| 5,428,758 | 6/1995 | Salsburg | 395/400 |

OTHER PUBLICATIONS

"Parity Preservation for Redundant Array of Independent Direct Access Storage Device Data Loss Minimization and Repair", by C. V. Crews, D. C. Mairet & D. A. Styczinski, IBM Technical Disclosure Bulletin, vol. 36, No. 03 Mar. 1993, pp. 473–478.

*Primary Examiner*—Robert W. Beausoliel, Jr.
*Assistant Examiner*—Glenn Snyder
*Attorney, Agent, or Firm*—Joan Pennington

[57] ABSTRACT

An array controller implemented method and apparatus are provided for dynamically expanding a redundant array of independent disk drives (RAID) by adding any number M of direct access storage devices (DASDs) to the original array while maintaining data availability and system performance to an array user. A logical to physical address map (LPAM) of original array (LPAM-O) and of expanded array (LPAM-E) and initial array state information are established and stored. A selected domain of data blocks is defined for deferred access to an array user. Then the selected domain of data blocks is read using LPAM-O. Parity information is calculated with the read data of the selected domain of data blocks. Then the read selected domain of data blocks and the calculated parity information are written to the expanded array using LPAM-E. Updated array state information is stored responsive to the selected domain of data blocks and the calculated parity information being written and the last defined selected domain of data blocks for deferred access to an array user is undefined. A next selected domain of data blocks for deferred access to an array user is defined and read using LPAM-O. The sequential machine operations of calculating parity information, writing the selected domain of parity and data blocks, storing updated array state information, undefining the last defined selected domain of data blocks and defining a next selected domain of data blocks are repeated until all data blocks of the original array have been written to the expanded array.

12 Claims, 5 Drawing Sheets

METHOD AND APPARATUS FOR DYNAMICALLY EXPANDING A REDUNDANT ARRAY OF DISK DRIVES

BACKGROUND OF THE INVENTION

1. Field of the Invention

The present invention relates generally to a data processing system including a redundant array of disk drives and more particularly to a method and apparatus for dynamically expanding a redundant array of independent disk drives (RAID) by adding one or more disk drives while the RAID subsystem remains up and running during the expansion of the RAID.

2. Description of the Prior Art

Various types of storage units, such as direct access storage devices (DASDs) are used to store data for known data processing systems. One often used type of DASD is a magnetic disk unit including a number of disks having surfaces with magnetic active material onto which data is written and from which data is read by magnetic read/write heads. In other types of DASDs, optical or other data storage media may be employed.

In a magnetic disk unit, the disks are formatted to define sectors and tracks upon the disk surfaces. Tracks are usually circular regions coaxial with the disk axis where data may be written, and sectors are parts of the tracks capable of storing a predetermined quantity of data written to the disk. Axially aligned tracks on the disks of a DASD are referred to as cylinders. The sectors of a DASD where blocks of data are stored have unique physical data block addresses (DBA). The disks of the DASD spin in unison around a common axis, and the read/white heads, usually one for each surface, are moved radially in unison across the disk surfaces. When data is read from or written to a physical DBA, the heads are moved into alignment with the cylinder containing the track in which the DBA is found, and the data transfer takes place as the sector or sectors of the DBA spin under the head.

Important considerations in the design and use of DASDs are capacity, speed of data transfer and reliability. For reasons including those discussed in Patterson et al., A Case for Redundant Arrays of Inexpensive Disks (RAID)", ACM SIGMOD Conference, Chicago, Ill., Jun. 1–3, 1988, increasing performance levels attained by central processing units (CPUs) and system memory in data processing systems result in the need for larger and faster data storage systems. To achieve these goals of capacity and speed, arrays containing a number of DASDs have been used rather than a single large DASD for data storage.

In a redundant array of independent disk drives (RAID), various modes of operation have been employed to effect reliability. In a RAID type 5 subsystem, a parity based correction is used. The array may include a selected number N+1 of DASDs. Blocks of data called stripes typically ranging from several sectors to a full DASD track are written on N of the DASDs. A parity block is formed by calculating the exclusive-or (XOR) of the N data blocks and storing this parity block on the remaining one of the N+1 DASDs in the array. The parity fields of the array are spread across all N+1 DASDs in the RAID type 5 subsystem. For each set of N blocks of data that are protected by a parity block, the location of the data and parity blocks is varied in a manner that distributes the parity blocks evenly across all DASDs in the RAID type 5 subsystem.

A problem with the RAID type 5 subsystem is the difficulty encountered with the addition of more DASDs to the original N+1 DASD array after the array is in operation and contains useful data. Ideally, the expansion process can be accomplished without disrupting access to the useful data already stored in the array, and with the minimum performance impact to the user of the array. In many known arrangements, the method for adding DASDs to an existing RAID type 5 subsystem involves a save/restore process during which the data on the array is not available to the array user. In other arrangements the addition of one or more DASDs is accomplished without the save/restore process, but with periods during which data in unavailable to the array user as data is being rearranged on the expanded set of DASD devices.

SUMMARY OF THE INVENTION

It is a principal object of the present invention to provide an apparatus and efficient method for dynamically expanding a redundant array of independent disk drives (RAID) by adding any number of direct access storage devices (DASDs) to the array that overcomes many of the disadvantages of prior art arrangements. Other important objects of the invention are to provide such apparatus and method that maintains parity protection for all data within the array at all times during the expansion process; to provide such apparatus and method that maintains the logical addressing sequence of the data as full rows of the resulting array as the array is expanded by adding one or more new DASDs; and to provide such apparatus and method that is efficient in the use of DASD resources minimizing read/write overhead activity to the DASDs in the array during the expansion process.

In brief, the objects and advantages of the present invention are achieved by an array controller implemented method and apparatus for dynamically expanding a redundant array of independent disk drives (RAID) by adding any number M of direct access storage devices (DASDs) to the original array to provide an expanded array. A logical to physical address map (LPAM) of the original array (LPAM-O) and of the expanded array (LPAM-E) and initial array state information are established and stored. A selected domain of data blocks is defined for deferred access to an array user. Then the selected domain of data blocks is read using LPAM-O. Parity information is calculated with the read data of the selected domain of data blocks. Then the read selected domain of data blocks and the calculated parity information are written to the expanded array using LPAM-E. Updated array state information is stored responsive to the selected domain of data blocks and the calculated parity information being written and the last defined selected domain of data blocks for deferred access to an array user is undefined. A next selected domain of data blocks for deferred access to an array user is defined and read using LPAM-O. The sequential machine operations of calculating parity information, writing the selected domain of parity and data blocks, storing updated array state information, undefining the last defined selected domain of data blocks and defining a next selected domain of data blocks are repeated until all data blocks of the original array have been written to the expanded array.

BRIEF DESCRIPTION OF THE DRAWING

The present invention together with the above and other objects and advantages may best be understood from the following detailed description of the preferred embodiment of the invention illustrated in the drawings, wherein.

DETAILED DESCRIPTION OF THE PREFERRED EMBODIMENTS

Figure 1:
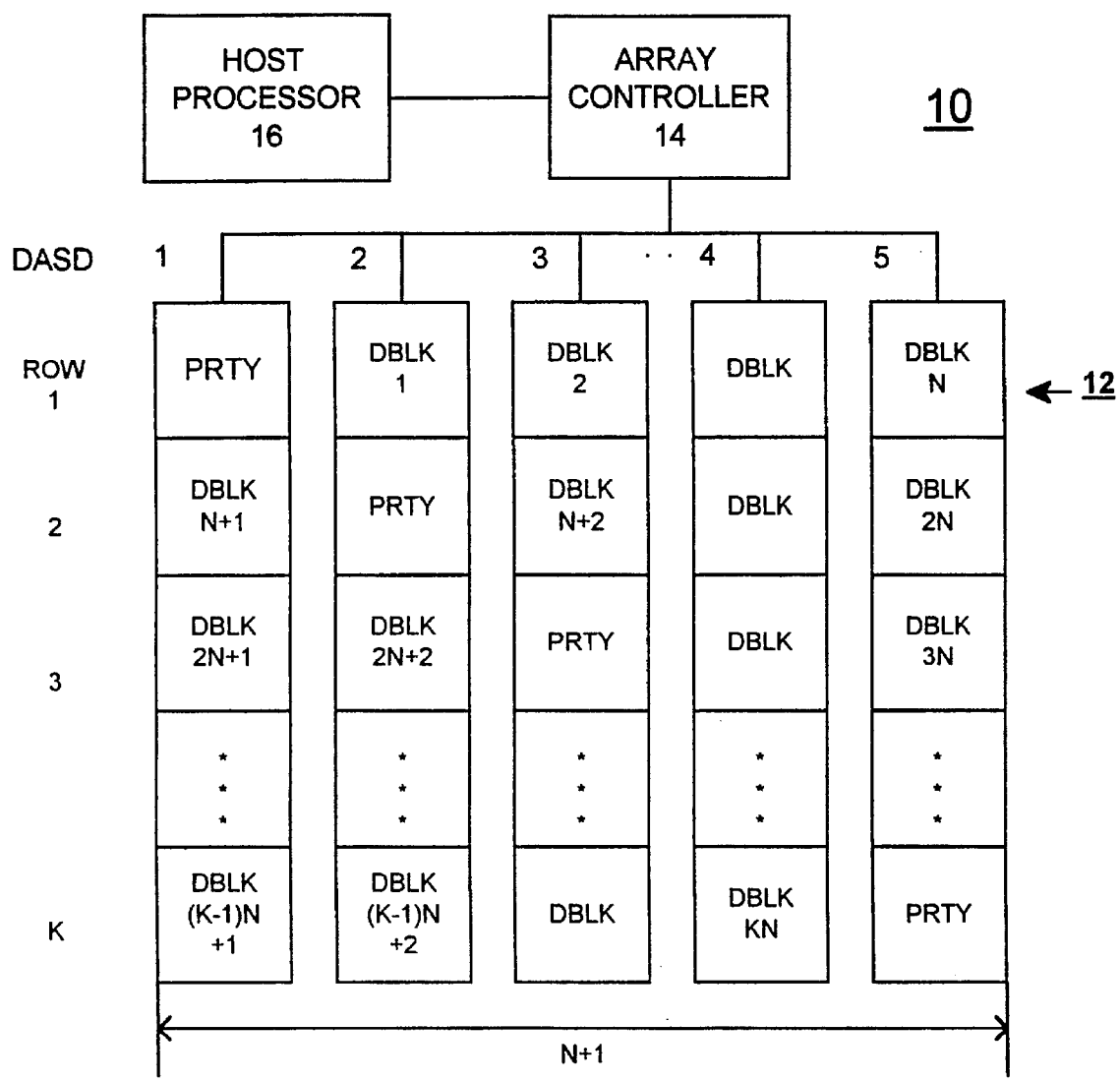
FIG. 1 is a schematic and block diagram of a data processing system including a redundant array of (N+1) disk drives embodying the present invention.

Referring now to FIG. 1 of the drawing, there is shown a data processing system generally designated as 10 embodying the present invention and in which the dynamic expansion method of the present invention may be carried out. The data processing system 10 includes a redundant array (N+1) of direct access storage devices (DASDs) or disk drives generally designated as 12 controlled by an array controller 14 with one or more host processors 16. Preferably the array 12 is a RAID type 5, arranged as shown.

The present invention provides an apparatus and method for expanding an existing, operational RAID array 12 through the addition of any number M of DASDs. Features of the invention are that parity protection for all data within the array is maintained at all times during the expansion process; the logical addressing sequence of the data is maintained as full rows of the resulting array as the array is expanded by adding the new M DASDs; read/write overhead activity is minimized to the DASDs in the array during the expansion process for efficient use of DASDs' resources and minimal impact to the array user results from either a data unavailability or performance viewpoint.

In FIG. 1, RAID type 5 array 12 consisting of a selected number N+1 of DASDs assumed to contain useful data, where N+1 is equal to five as shown. The array 12 consists of K rows of data blocks, with each row having N data blocks (DBLK). One remaining block in each row 1-K contains the parity field (PRTY) which provides the redundancy for the row of the array. The logical order of the data blocks is from left to right within each row starting with row 1 and proceeding through row K. For example, row 1 contains data blocks DBLK 1 through DBLK N; row 2 contains data blocks DBLK N+1 through DBLK 2N and row K contains data blocks DBLK (K-1)N+1 through DBLK KN.

Figure 2:
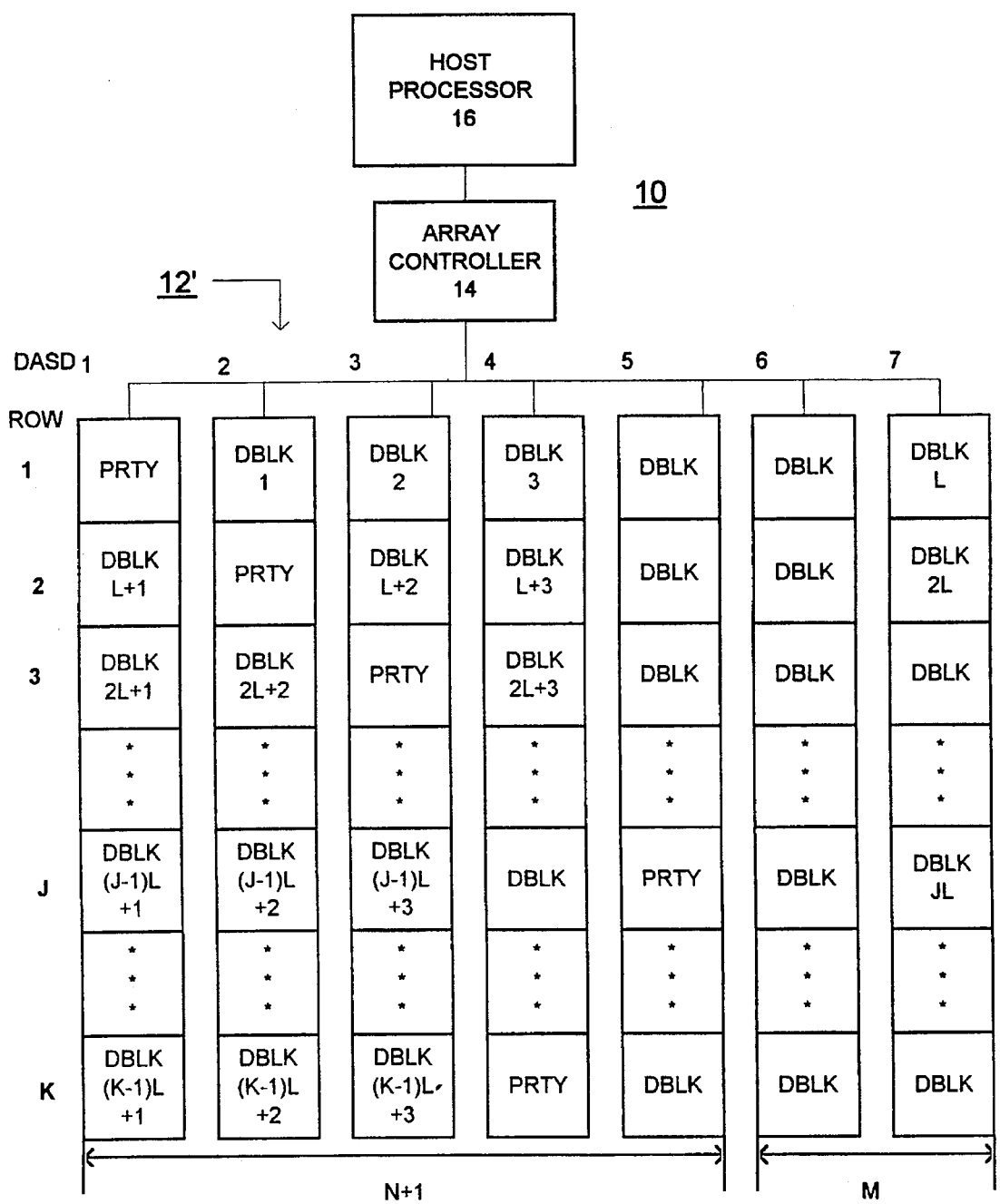
FIG. 2 is a schematic and block diagram of a system including a redundant array of (N+1) original disk drives and (M) expansion disk drives embodying the present invention.

FIG. 2 shows the same RAID type 5 as FIG. 1 after the array 12 has been expanded by the addition of M DASD devices to provide an expansion array 12'. Expansion array 12' contains N+M+1 DASDs, where N+M+1 equals seven as shown. In FIG. 2, expansion array 12' represents the state of the expanded array after the expansion process of incorporating the M new DASDs into the array has been completed. Note that the expanded array 12' contains K rows of physical blocks since the number of rows in the array is determined by the data block or stripe size and the capacity of the each DASD. Both the data block size and the capacity of the each DASD remain unchanged from FIG. 1 to FIG. 2. In the expansion array 12' each row now contains L data blocks (DBLK), where L equals N+M. As in array 12 of FIG. 1, one remaining (N+M+1) block in each row 1-K contains the parity block (PRTY) which provides the redundancy for that row of the expansion array 12'. After the expansion process is completed, the expanded array 12' contains the NK data blocks from the original array 12 with the logical order of the blocks again being left to right within a row starting with row 1 and proceeding through row J, where J is determined by the following equations:

J= NK/(N+M), where the result or quotient of this division produces no remainder. In this case, the NK data blocks from the original array 12 map evenly into J rows of the expanded array 12'. Otherwise, where NK/(N+M) produces a non-zero remainder, then J equals the integer quotient of this division plus 1. In this case, the NK data blocks of the original array 12 fill J-1 rows of the expanded array 12' and partially fill row J.

The remaining rows K minus row J and any unused part of row J represent the new data storage space made available by the expansion array 12' including the new DASDs M or DASDs 6 and 7, as shown in FIG. 2.

Array controller 14 is the logical entity which provides access to the DASD devices in the original array 12 and the expansion array 12' and manages the RAID type 5 machine operations algorithm which provides the redundancy for the array; provides logical to physical address conversion for each DASD in the array 12 and 12'; and issues all commands, such as read and write, to access the DASDs in the array 12 and 12'. During normal operation of the system 10, array controller 14 maintains a logical to physical address map (LPAM) for mapping of logical data address information typically provided to the array controller 14 by a higher level logic entity, such as host processor 16, to the actual physical address of the data on one or more DASDs in the array 12 and 12'.

Figure 3A:
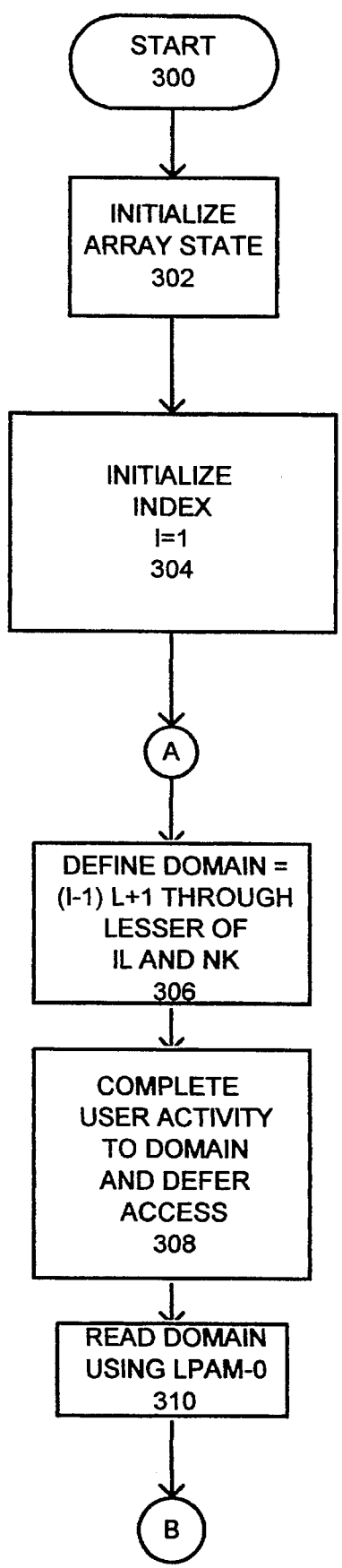
FIGS. 3A, 3B and 3C together provide a machine operations chart illustrating an expansion method and apparatus in accordance with the invention.
Figure 3B:
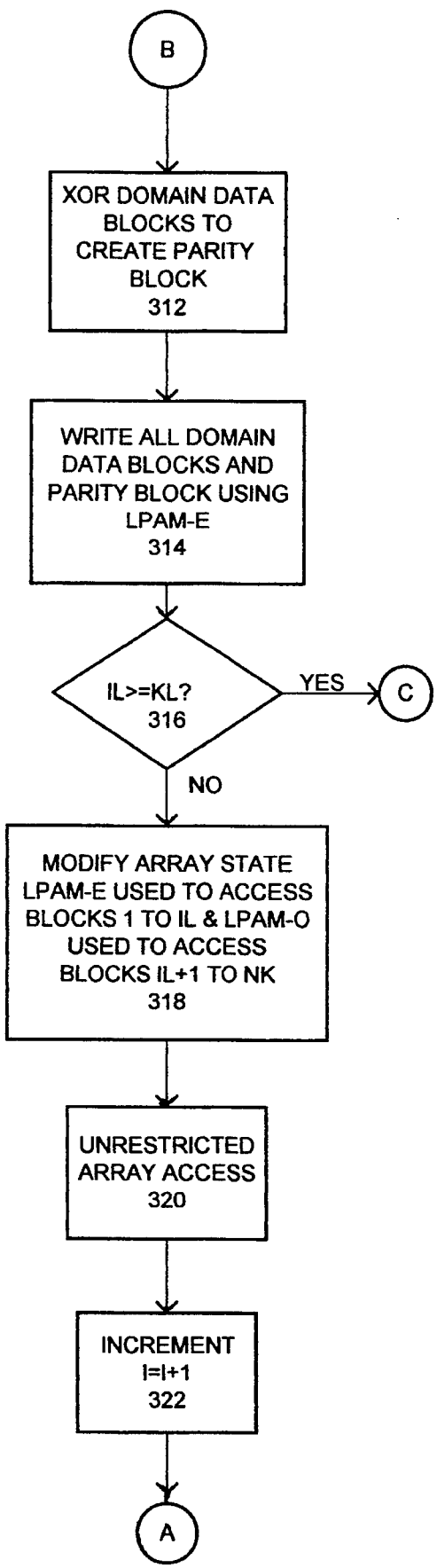
Figure 3C:
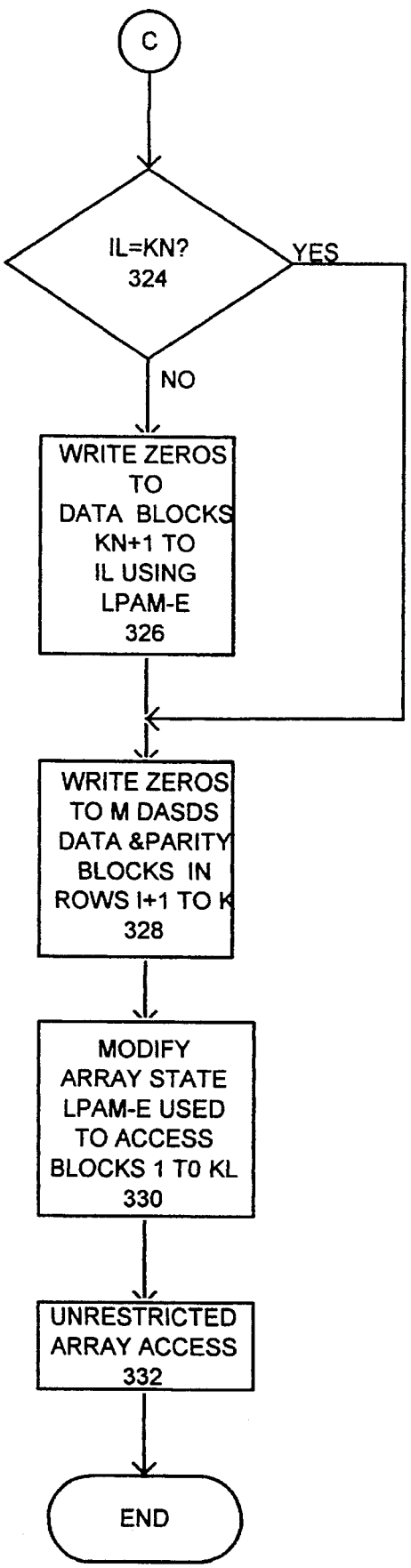

Having reference to FIGS. 3A, 3B and 3C, there are shown sequential machine operations for expanding the array 12 of N+1 DASDs 1-5 to obtain the array 12' of N+M+1 DASDs 1-7. LPAM-O represents the logical to physical address map (LPAM) for the original array 12 of FIG. 1 before any array expansion procedure is invoked. LPAM-E represents the LPAM for the expanded array 12' of FIG. 2 after expansion of the original array 12 by adding M DASDs has been completed.

Referring initially to FIG. 3A, the sequential operations begin at a block 300 labelled START. The first operation as indicated at a block 302 labelled INITIALIZE ARRAY STATE is to establish an initial array state with LPAM-O initially used to provide logical to physical address conversion for all NK data blocks in the array 12. Then a procedure index I is set equal to one as indicated at a block 304 labelled INITIALIZE INDEX I=1. Next a working set of data blocks is defined by (I-1)L+1 through lesser of I times L (IL) and N times K (NK) as indicated at a block 306 labelled DEFINE DOMAIN = (I-1)L+1 THROUGH LESSER OF IL AND NK. Then to establish RAID type 5 parity for the data blocks in the domain under the LPAM-E address map, the array controller 14 first completes all active accesses to DASDs for the domain data blocks (I-1)L+1 through the lesser of IL and NK, and defers further user access to the DASDs for these domain data blocks as indicated at a block 308 labelled COMPLETE USER ACTIVITY TO DOMAIN AND DEFER ACCESS. Next array controller 14 reads the data blocks (I-1)L+1 through the lesser of IL and NK of the defined domain from the DASDs using LPAM-O as indicated at a block 310 labelled READ DOMAIN USING LPAM-O.

Referring to FIG. 3B, then array controller 14 performs an XOR function on data blocks (I-1)L+1 through the lesser of IL and NK read at block 310 to form a parity block for this set of data blocks as indicated at a block 312 labelled XOR DOMAIN DATA BLOCKS TO CREATE PARITY BLOCK.

Array controller 14 writes data blocks (I−1)L+1 through the lesser of IL and NK and the parity block to the DASDs using LPAM-E as indicated at a block 314 labelled WRITE ALL DOMAIN DATA BLOCKS AND PARITY BLOCK USING LPAM-E. The parity block is written to the physical parity block location in the Ith row of the array as determined by LPAM-E, as illustrated in FIG. 2.

During the execution of the write operation at block 314, the array controller 14 must manage the writing of data in a manner consistent with the data integrity rules of the array controller design. At a minimum, no single failure which occurs in the RAID type 5 subsystem including the controller 14 and any DASDs in the array 12' should result in the loss of data during the expansion process. These methods are known and exist in any conventional RAID type 5 subsystem to which this invention advantageously is applied.

Next it is determined if IL is greater than or equal to KN as indicated at a decision block 316 labelled IL>=KN? When IL is less than KN, the array state is modified with LPAM-E used for logical to physical address conversion for data blocks 1 through IL and LPAM-O used for logical to physical address conversion for data blocks IL+1 through NK as indicated at a block 318 labelled MODIFY ARRAY STATE LPAM-E USED TO ACCESS BLOCKS 1 TO IL & LPAM-O USED TO ACCESS BLOCKS IL+1 TO NK. Then the array controller 14 allows any deferred accesses to the DASDs for the domain data blocks (I−1)L+1 through IL, cancelling the defer condition established at block 306 as indicated at a block 320 labelled UNRESTRICTED ARRAY ACCESS. Then the procedure index is incremented as indicated at a block 322 labelled INCREMENT I=I+1. Then the sequential operations return to block 306 in FIG. 3A to define a next domain of data blocks to be processed or reconfigured.

Referring to FIG. 3C, following the determination that IL is greater than or equal to KN at block 316 in FIG. 3B, it is determined if IL is equal to KN as indicated at a decision block 324 labelled IL=KN. When IL is not equal to KN, then the array controller 14 writes zeros to all data blocks KN+1 through IL using LPAM-E as indicated at a block 326 labelled WRITE ZEROS TO DATA BLOCKS KN+1 TO IL USING LPAM-E. Associated parity blocks are not updated during the write operation at block 326. After the write operation at block 326 or when IL is equal to KN, then the array controller 14 writes zeros to all physical blocks for data and parity of the M expansion DASDs 6 and 7 in rows I+1 through K as indicated at a block 328 labelled WRITE ZEROS TO M DASDS DATA & PARITY BLOCKS IN ROWS I+1 TO K. Then the array state is modified with LPAM-E used to access and provide logical to physical address conversion for data blocks 1 through KL as indicated at a block 330 labelled MODIFY ARRAY STATE LPAM-E USED TO ACCESS BLOCKS 1 TO KL. The array controller 14 provides unrestricted array access as indicated at a block 332 labelled UNRESTRICTED ARRAY ACCESS to complete the expansion method. With the expansion procedure completed, all parity fields within the expanded array 12' are valid.

While the invention has been described with reference to details of the illustrated embodiments, these details are not intended to limit the scope of the invention as defined in the appended claims.

What is claimed is:

1. An array controller implemented method for dynamically expanding a redundant array of independent disk drives (RAID) by adding any number M of direct access storage devices (DASDs) to the original array to provide an expanded array comprising the steps of:

establishing a logical to physical address map (LPAM) of the original array (LPAM-O) and of the expanded array (LPAM-E) and storing initial array state information;

defining a selected domain of data blocks for deferred access to an array user and reading said selected domain of data blocks using LPAM-O; said selected domain of data blocks for deferred access being the only unavailable data blocks to an array user;

calculating parity information with said read data of said selected domain of data blocks;

writing said read selected domain of data blocks and said calculated parity information using LPAM-E;

storing updated array state information responsive to said selected domain of data blocks and said calculated parity information being written;

undefining said last defined selected domain of data blocks for deferred access to an array user;

defining a next selected domain of data blocks for deferred access to an array user and reading said next selected domain of data blocks using LPAM-O; and sequentially repeating said above steps of calculating parity information, writing, storing, undefining, defining and reading until all data blocks of the original array have been written to the expanded array.

2. An array controller implemented method for dynamically expanding a redundant array of (N+1) independent disk drives (RAID) as recited in claim 1 wherein said step of establishing a logical to physical address map (LPAM) of the original array (LPAM-O) and of the expanded array (LPAM-E) includes the steps of:

mapping contiguous data storage blocks for each of said DASDs and storing said LPAM of array information of the original array (LPAM-O) and of the expanded array (LPAM-E).

3. An array controller implemented method for dynamically expanding a redundant array of independent disk drives (RAID) as recited in claim 1 wherein said step of defining a selected domain of data blocks for deferred access to an array user includes the steps of:

establishing a procedure index I;

defining said selected domain of data blocks utilizing said procedure index I and a parity group of DASDs blocks within the expanded array; and incrementing said procedure index I for defining said next selected domain of data blocks.

4. An array controller implemented method for dynamically expanding a redundant array of independent disk drives (RAID) as recited in claim 3 wherein both said original array and said expanded array includes a plurality of rows 1–K, said original RAID array includes a set number N+1 of DASDs in each row, said expanded RAID array includes a set number M+N+1 of DASDs in each row and L is defined as M+N, wherein said step of defining said selected domain of data blocks utilizing said procedure index I and a parity group of DASDs blocks within the expanded array includes the step of calculating and defining domain data blocks of (I−1) times L+1 through the lesser of I times L (IL) and N times K (NK).

5. An array controller implemented method for dynamically expanding a redundant array of independent disk drives (RAID) as recited in claim 1 further includes the step of concurrently providing user access to the expanded array utilizing said stored array state information and said defined domain of data blocks for deferred access.

6. An array controller implemented method for dynamically expanding a redundant array of independent disk drives (RAID) as recited in claim 1 wherein said step of calculating parity information with said read data of said selected domain of data blocks includes the step of performing an exclusive or (XOR) function of said read data of said selected domain of data blocks.

7. An array controller implemented method for dynamically expanding a redundant array of independent disk drives (RAID) as recited in claim 1 wherein said step of writing said read selected domain of data blocks and said calculated parity information using LPAM-E includes the step of sequentially writing said calculated parity information spread across all N+1+M DASDs in the extended array.

8. An array controller for dynamically expanding a redundant array of (N+1) independent disk drives (RAID) by adding any number M of direct access storage devices (DASDs) to the original array to provide an expanded array of DASDs (N+M+1) comprising:

means for establishing a logical to physical address map (LPAM) of the original array (LPAM-O) and of the expanded array (LPAM-E) and for storing initial array state information;

means for sequentially defining a selected domain of data blocks for deferred access to an array user using LPAM-O; said selected domain of data blocks for deferred access being the only unavailable data blocks to an array user;

means responsive to said selected domain defining means for writing said defined selected domain of data blocks to the expanded array using LPAM-E;

means responsive to said selected domain defining means and writing means for updating and for storing array state information; and means for providing user access to the expanded array responsive to said stored array state information.

9. An array controller for dynamically expanding a redundant array of (N+1) independent disk drives (RAID) as recited in claim 8 wherein both said original array and said expanded array includes a plurality of rows 1–K and wherein said means for sequentially defining a selected domain of data blocks for deferred access to an array user using LPAM-O includes means for calculating and defining domain data blocks of (I−1) times L+1 through the lesser of I times L (IL) and N times K (NK), where L equals N+M and I is a sequential index value.

10. An array controller for dynamically expanding a redundant array of (N+1) independent disk drives (RAID) as recited in claim 8 wherein said means responsive to said selected domain defining means for writing said defined selected domain of data blocks to the expanded array using LPAM-E include means for calculating and writing a parity block.

11. An array controller for dynamically expanding a redundant array of (N+1) independent disk drives (RAID) as recited in claim 8 wherein said means for providing user access to the expanded array responsive to said stored array state information includes means for restricting array access to a currently defined one of said sequentially defined selected domains of data blocks for deferred access.

12. Apparatus for dynamically expanding a redundant array of independent disk drives (RAID) by adding any number M of direct access storage devices (DASDs) to the original array to provide an expanded array comprising:

means for establishing a logical to physical address map (LPAM) of the original array (LPAM-O) and of the expanded array (LPAM-E) and for storing initial array state information;

means for defining a selected domain of data blocks for deferred access to an array user and reading said selected domain of data blocks using LPAM-O; said selected domain of data blocks for deferred access being the only unavailable data blocks to an array user;

means for calculating parity information with said read data of said selected domain of data blocks;

means for writing said read selected domain of data blocks and said calculated parity information using LPAM-E;

means for storing updated array state information responsive to said selected domain of data blocks and said calculated parity information being written;

means for undefining said last defined selected domain of data blocks for deferred access to an array user;

means for sequentially defining a next selected domain of data blocks for deferred access to an array user until all data blocks of the original array have been written to the expanded array.

* * * * *